Patented Jan. 27, 1942

2,271,218

UNITED STATES PATENT OFFICE 2,271,218

METHOD OF DECOMPOSING MAIZE STRAW FOR TEXTILE PURPOSES

Friedrich Baudisch, Vienna, Germany

No Drawing. Application August 17, 1938, Serial No. 225,343. In Austria August 31, 1937

2 Claims. (Cl. 92—10)

This invention relates to the decomposing of maize straw. The hitherto known methods of decomposing maize straw have not led to any useful results for the reason that they do not take sufficient account of the peculiarities of this type of fibre and attack the fibre to an excessive extent. In contrast thereto, the present invention provides a method of decomposing (retting) maize straw which yields a strong, spinnable, and elastic fibre admirably suited for certain textile purposes. In accordance with the invention the maize straw is subjected, if desired with the application of pressure, to a process of digesting with alkali and substances which split off ammonia under the influence of alkali, for example urea, whereupon, after washing away the parts that are then soluble, the remainder is dried and squeezed simultaneously and then further worked up mechanically.

It is known, it is true, to decompose flux by boiling in urine with the addition of alkali and Turkey-red oil soap. It is also known to decompose flax by subjecting it to the action of urea for long periods at low temperatures. But it has not hitherto been known that a method substantially similar to this is also admirably suited for the decomposing of maize straw.

The following is an example of the carrying out of the method according to the invention.

The corn straw is digested by boiling in suitable containers in a weak alkali solution, e. g. a 1-5% soda solution, with or without the application of pressure, until the leafy substance is easily detachable by the finger nail, which condition is reached on the material becoming glassy in appearance after boiling for about 1-2 hours (and somewhat sooner if the boiling is carried out under pressure). The material is then thoroughly washed, and the leafy parts, which are then soluble, are removable with the aid of suitable squeezing devices.

The material is then introduced into a 1-3% solution of urea, brought to the boil for a short time, and then left to stand in the solution for a considerable length of time (3-4 hours). After the addition of a 1-3% solution of alkali (sodium, potassium, or calcium hydroxide, soda, or the like) boiling is repeated, with or without the application of pressure, for 1-3 hours. Free ammonia is thereby evolved which, while in the nascent state, effects the complete detaching of the gliadin from the fibre.

After washing and drying, the material is subjected to mechanical treatment by tearing, combing, teasing, carding, and so forth.

I claim:

1. A method of producing spinnable textile fibers from corn straw, which method comprises the steps of boiling the straw with 1-5% soda solution, washing and squeezing the material to remove the leafy parts, then boiling for a short time with a 1-3% urea solution, leaving the material in said urea solution for about 3 to 4 hours adding to the urea solution a solution of 1-3% alkali, boiling once more for 1 to 3 hours thereby evolving free ammonia, and washing, drying and disintegrating so as to form fibers.

2. A method of producing spinnable textile fibers from corn straw, which method comprises the steps of boiling the straw for about 1 to 2 hours with a 1 to 5% soda solution, washing and squeezing the material to remove the leafy parts, then boiling the material for a short time with a 1 to 3% solution of a substance evolving free ammonia under the influence of alkali, leaving the material in said solution for about 3 to 4 hours, adding a 1 to 3% solution of alkali, boiling once more for 1 to 3 hours, and washing, drying and disintegrating the fibers.

FRIEDRICH BAUDISCH.